(12) United States Patent
Hamilton et al.

(10) Patent No.: US 6,529,847 B2
(45) Date of Patent: Mar. 4, 2003

(54) MULTIVARIABLE TRANSMITTER

(75) Inventors: Gordon L. Hamilton, North Attleboro, MA (US); Peter Allstrom, Attleboro, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/761,431

(22) Filed: Jan. 16, 2001

(65) Prior Publication Data

US 2002/0049559 A1 Apr. 25, 2002

Related U.S. Application Data

(60) Provisional application No. 60/176,391, filed on Jan. 13, 2000.

(51) Int. Cl.[7] .............................. G01F 1/00; G01L 9/00
(52) U.S. Cl. ........................... 702/127; 702/47; 73/718; 73/727
(58) Field of Search ................................. 702/127, 138, 702/99.1, 45, 47; 73/727, 726, 721, 718, 861.02, 861.03

(56) References Cited

U.S. PATENT DOCUMENTS

| | | | |
|---|---|---|---|
| 4,799,169 A | * | 1/1989 | Mims .......................... 702/47 |
| 5,469,749 A | | 11/1995 | Shimada et al. .......... 73/861.47 |
| 5,495,769 A | * | 3/1996 | Broden et al. ................. 73/718 |
| 5,681,997 A | * | 10/1997 | McHale et al. ................ 73/727 |
| 5,870,695 A | * | 2/1999 | Brown et al. ................ 702/138 |
| 5,899,962 A | * | 5/1999 | Louwagie et al. ............. 702/99 |
| 6,085,576 A | * | 7/2000 | Sunshine et al. ........... 73/29.01 |

OTHER PUBLICATIONS

International Search Report Completed on Jun. 6, 2001 and Mailed on Jun. 13, 2001.

* cited by examiner

*Primary Examiner*—Bryan Bui
(74) *Attorney, Agent, or Firm*—Kevin A. Oliver; Foley Hoag LLP

(57) ABSTRACT

A method and system comprising providing a plurality of control signals, the control signals having one or more on periods that do not coincide with the on periods of the other control signals and a first frequency at which the one or more on periods are repeated, the method and system also including driving a plurality of process measurement transducers in response to the control signals by selectively coupling the transducers to ground, and capturing the output of the process measurement transducers within the one or more on periods of the control signals.

31 Claims, 4 Drawing Sheets

MULTIVARIABLE TRANSMITTER

RELATED APPLICATIONS

This application claims priority to, and incorporates by reference, the entire disclosure of U.S. Provisional Patent Application No. 60/176,391, filed on Jan. 13, 2000.

BACKGROUND OF THE INVENTION

Multivariable transmitters are known in industrial control and measurement for use in measuring process variables. A typical multivariable transmitter has a number of sensors from which process data is gathered, and may include a processor for calculating a physical process parameter based upon the gathered process data. For example, a multivariable transmitter for measuring flow rates in a pipe may include a temperature sensor and one or more pressure sensors. Data from these sensors, along with other physical parameters, may be used to calculate a flow rate through the pipe on an ongoing basis.

One example of a multivariable transmitter is described, for example in U.S. Pat. No. 5,495,769 to Broden, et al. ("Broden"). Broden discloses a multivariable transmitter that calculates flow through a pipe using processes measurements taken from at least three sensors, including a temperature sensor, a differential pressure sensor and an absolute pressure sensor. Broden discusses a need for reducing power consumption in field mounted multivariable measurement transmitters, and presents a system using simplified flow calculations that reduce processing demands on the transmitter. As a significant disadvantage, the system described in Broden may nonetheless use substantial power to excite sensors when taking process measurements. However, industrial standards such as those promulgated by the International Electrotechnical Commission ("IEC") may specify a current for field instrumentation of less than four milliamps, including all processors and other circuitry, along with current used to excite any sensors.

There remains a need for a multivariable transmitter that conserves the use of power to excite sensors. There also remains a need for an accurate, low-cost calibration technique that may be used with ratiometric measurements typical of bridge-type sensors found in multivariable transmitters.

SUMMARY OF THE INVENTION

The systems described herein include a multivariable transmitter with one or more bridge sensors for measuring absolute pressure, differential pressure, and temperature of a process fluid in a pipe. In order to reduce current draw, the sensors are excited one at a time, each during an on period of a drive signal. Each sensor output is captured by a gated integrator that is coupled to the sensor output within the on period. The gated integrator stores a value representative of the sensor output on a node that may then be sampled by an analog-to-digital converter. Using this approach, the analog-to-digital converter may sample at a frequency independent of the frequency of the sensor drive signal. For example, the analog-to-digital converter may sample at a frequency that is less than one-half the frequency of the on period, in order to avoid certain artifacts of the digitization process. The systems described herein also include a technique for ratiometric calibration of a data acquisition system that, independent of true voltages for sensor measurements, can reproduce highly accurate results from ratiometric sensors such as bridges.

A method for process measurement disclosed herein includes: providing a power source; selectively coupling the power source through a process measurement transducer with a first frequency, the process measurement transducer having an output; measuring the output of the process measurement transducer to provide a measured output; sampling the measured output at a second frequency that is independent of the first frequency to provide a sampled value; and providing a digital representation of the sampled value.

In another aspect, a method for process measurement disclosed herein includes: providing a drive signal, the drive signal having an on period at a first frequency; selectively driving one of a plurality of process measurement transducers in response to the drive signal; capturing the output of the one of the plurality of process measurement transducers at the first frequency; and digitally sampling the measured output at a second frequency that is independent of the first frequency.

In another aspect, a method for process measurement disclosed herein includes: providing a control signal, the control signal having one or more on periods and a first frequency at which the one or more on periods are repeated; driving a process measurement transducer with a power source in response to the control signal, the process measurement transducer having an output; capturing the output of the process measurement transducer within the on period of the control signal to provide a captured output; sampling the captured output at a second frequency that is independent of the first frequency to provide a sampled value; and providing a digital representation of the sampled value.

Capturing the output may include capturing the output on a node of a gated integrator. The gated integrator may include a low pass filter. Sampling the captured output may further include sampling the captured output with an analog-to-digital converter. The analog-to-digital convertemay be a sigma-delta analog-to-digital converter. The first frequency may be greater than the second frequency. The first frequency may be at least twice as high as the second frequency. The process measurement transducer may include a bridge having a differential output. The process measurement transducer may include at least one of an absolute pressure sensor, a differential pressure sensor, and a temperature sensor. The control signal may control operation of a switch, the switch coupling the power source to ground through the process measurement transducer. The methods above may further include applying the digital representation of the sampled value to calculate a process variable. The process variable may be a volume flow rate. The method may further include driving a plurality of process measurement transducers from the power source by selectively coupling the transducers to ground with a plurality of control signals, each of the control signals having an on period that does not coincide with the on periods of the other control signals.

A multivariable transmitter for measuring a process variable as disclosed herein may include: a power source; a driver, the driver providing a control signal having an on period and a first frequency at which the on period is repeated; a process measurement transducer selectively coupled between the power source and a ground in response to the control signal, the process measurement transducer having an output indicative of a process measurement; an integrator selectively coupled to the output of the process measurement transducer within the on period of the control signal, the integrator capturing the output of the process measurement transducer on a node of the integrator within the on period of the control signal; a digital sampler, the digital sampler acquiring a sampled value of the node of the integrator at a second frequency that is independent of the first frequency, and the digital sampler providing a digital representation of the sampled value; and a processor that receives the sampled value and calculates a process variable using the sampled value.

The process measurement may include at least one of an absolute pressure, a differential pressure, and a temperature of a process fluid. The process variable may be a flow rate of a process fluid. The processor may transmit at least one of the process variable or the process measurement to an external system.

In another aspect, a system for measuring a process variable as disclosed herein includes: a driver, the driver providing control signals having an on period and a first frequency at which the on period is repeated; a process measurement transducer driven with an excitation in response to the control signal, the process measurement transducer having an output indicative of a process variable; a gated integrator selectively coupled to the output of the process measurement transducer within the on period of the control signal, the gated integrator capturing the output of the process measurement transducer on a node of the gated integrator within the on period of the control signal; a digital sampler, the digital sampler acquiring a sampled value of the node of the gated integrator at a second frequency that is independent of the first frequency, and the digital sampler providing a digital representation of the sampled value; and a processor that receives the sampled value and calculates a process variable using the sampled value.

The driver may include a microcontroller. The process measurement transducer may include a bridge transducer having a differential output pair. The digital sampler may include a sigma-delta analog-to-digital converter.

In another aspect, a method for calibrating a device that has a plurality of selectable gains for use with ratiometric process measurements may include: selecting a first gain for a device; zeroing the device at the first gain to remove a first offset; measuring a fixed voltage with the device at the first gain to obtain a first measurement; selecting a second gain for the device; zeroing the device at the second gain to remove a second offset; measuring the fixed voltage with the device at the second gain to obtain a second measurement; calculating a ratiometric calibration constant that is proprotional to a ratio of the first measurement to the second measurement; and applying the ratiometric calibration constant to a process measurement that includes a ratio of a process measurement taken at the first gain and a process measurement taken at the second gain.

The method may include performing an initial calibration of the device using a known reference voltage. The method may include repeating measuring the fixed voltage with the device at the first gain to obtain an first average measurement; repeating measuring the fixed voltage with the device at the second gain to obtain a second average measurement; and calculating a ratiometric calibration constant using the first average measurement and the second average measurement. The method may include calculating a plurality of ratiometric calibration constants for a plurality of gains.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including a multivariable transmitter for measuring flow rate in a pipe. However, it will be understood by those of ordinary skill in the art that the methods and systems described herein may be suitably adapted to other process measurements, as well as the calculation of other process variables. The techniques described herein may have particular application to systems where a number of transducers are used with a limited power budget. All such adaptations and modifications that would be clear to one of ordinary skill in the art are intended to fall within the scope of the invention described herein.

Figure 1:
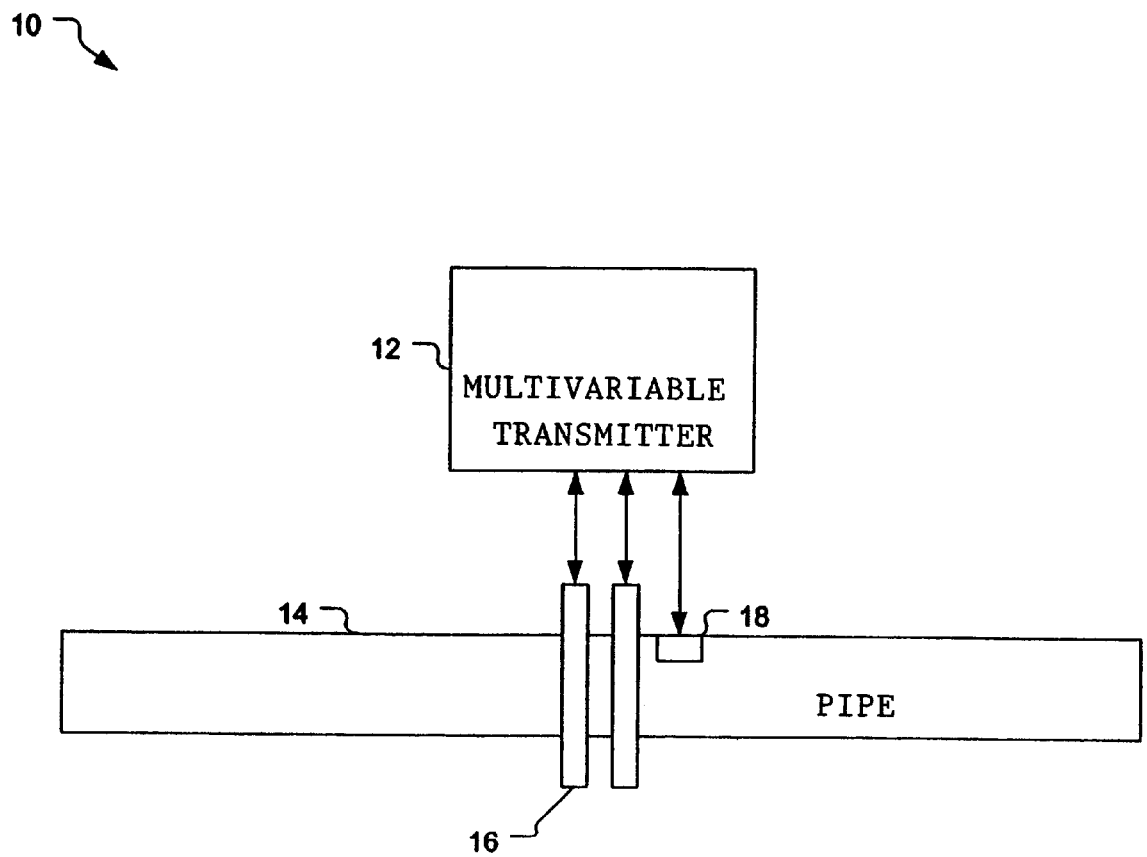
FIG. 1 shows a multivariable transmitter that may be used with the invention.

FIG. 1 shows a multivariable transmitter that may be used with the invention. In a multivariable transmitter system 10, a multivariable transmitter 12 may be fluidically coupled to a pipe 14 through a pipe flange 16 and a coupling 17. A temperature sensor 18, such as a 100 ohm platinum Resistive Thermometer Device ("RTD"), may be electrically coupled to the multivariable transmitter 12, and may sense a process temperature downstream from the pipe flange 16. Other sensors may also be provided, such as temperature sensing bridge for detecting a temperature of electronics within the multivariable transmitter 12. The multivariable transmitter 12 may be contained in a housing mechanically attached to, or adjacent to, the pipe 14. The multivariable transmitter 12 may include a polysilicon pressure sensor, such as that described in U.S. Pat. No. 5,681,997 to McHale, et al., or any other transducer or sensor that converts fluidic pressure, as sensed through the coupling 17, into an electrical signal. The multivariable transmitter 12 may also include circuitry for gathering data from the temperature and pressure sensors, converting the gathered data into a process variable, such as flow rate, and for generating an output indicative of the process variable for transmission as, for example, a 4–20 mA signal over an electrical connector 20.

Figure 2:
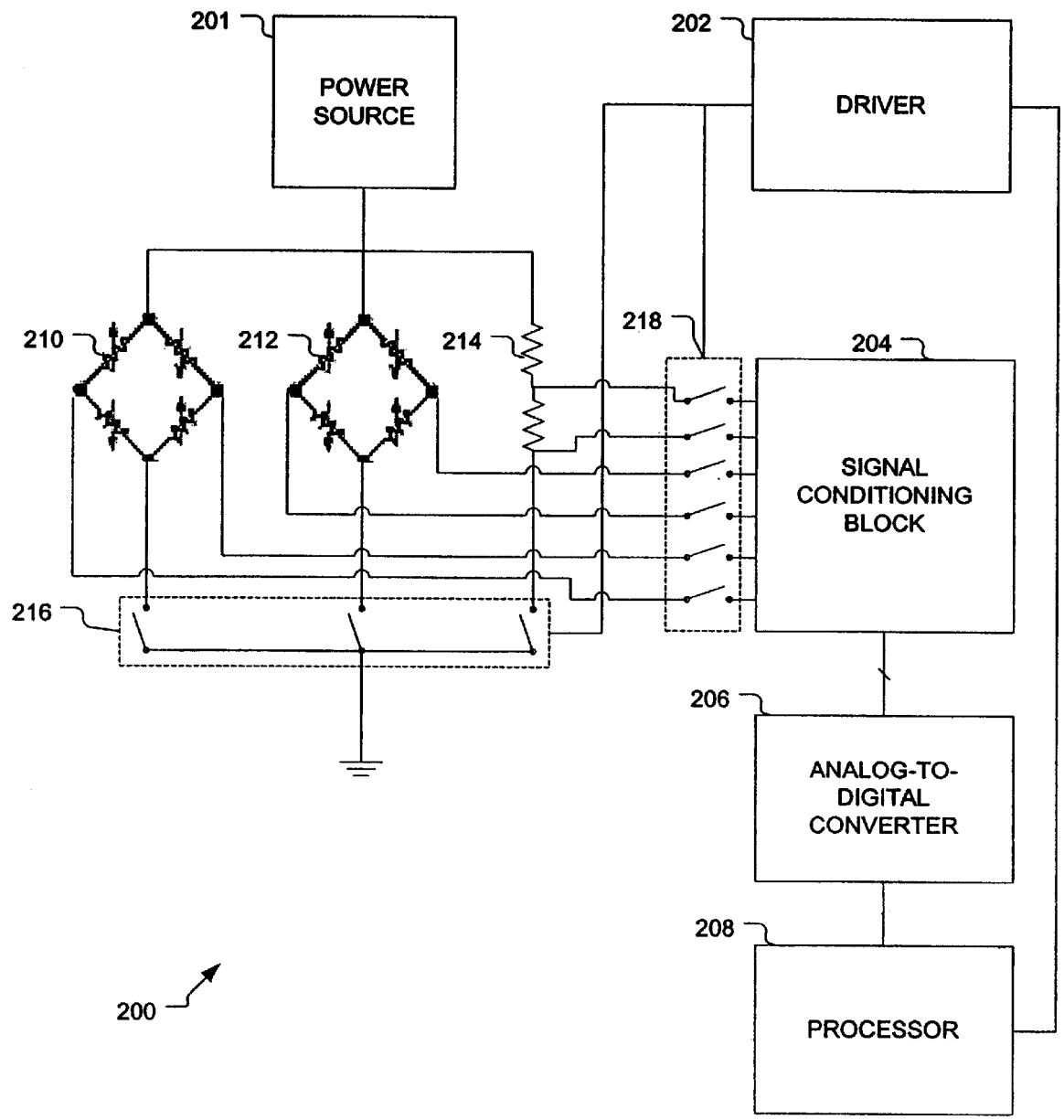
FIG. 2 is a block diagram of a circuit for taking process measurements.

FIG. 2 is a block diagram of a circuit for taking process measurements. The circuit 200 may be, for example, housed in the multivariable transmitter 12 of FIG. 1. The circuit 200 may include a power source 201, a driver 202, a signal conditioning block 204, an analog-to-digital converter 206, a processor 208, a first bridge transducer 210, a second bridge transducer 212, a half-bridge transducer 214, a first switch array 216, and a second switch array 218.

The driver 202 may operate as a state machine to control excitation of the first bridge transducer 210, the second bridge transducer 212, and the half-bridge transducer 214. The driver 202 may generate a drive signal, such as periodic, rectangular pulses, to the first switch array 216 to selectively couple one of the transducers between the power source 201 and ground. The power source 201 may be, for example, a DC voltage source. The switch array 216 may be a dual in-line package reed relay array, complementary metal oxide semiconductor switch array, metal oxide semiconductor field effect transistors, or any other switching device controllable by the driver 202, having sufficient switching speed to operate consistently with the systems described herein, and preferably having a low on resistance. It will be appreciated that other switching topologies may be used, such as a switch array on the power supply 201 side of the transducers, or the excitation signal may be provided through three separate outputs of the driver 202, each of which switches between an on and an off state. In addition, it will be appreciated that conditioning of one or more outputs of the driver 202 may be provided for conventional reasons, including isolation of the driver 202, increasing current drive to control activation of switches in the switch array 216, and so forth.

The driver 202 may also generate control signals to the second switch array 218, which may be a switch array such as those described above. The second switching array may selectively couple the transducer outputs to the signal conditioning block 204. The driver 202 may be any programmable device or other device, such as a timing device, capable of generating control signals to the first switch array 216 and the second switch array 218. One example of a microcontroller suitable for use as the driver 202 is the PIC16C505 microcontroller available from Microchip Technology. In an embodiment, the driver 202 generates control pulses to switch excitation signals through the transducers at a frequency of 100 Hz.

The signal conditioning block 204 may include analog circuitry that conditions signals received from the outputs of the transducers 210, 212, 214. For example, each output pair of each transducer may be connected, or 'gated', to an integrator in the signal conditioning block 204 through the second switch array 218. Each integrator may include a resistor in series with a capacitor, with an averaging or integrating node that captures a value associated with a differential transducer output pair when coupled to the transducer output through the second switch array 218. As may be seen in FIG. 2, a differential signal may be created for a single output transducer, such as the half-bridge transducer 214, by providing ground as one of the differential outputs. The analog-to-digital converter 206 may have high-impedance inputs, so that the value associated with a transducer output is stored on an averaging or integrating node when the node is decoupled from the transducer output. It will be appreciated that, although a simple resistor-capacitor circuit may be used, other circuit topologies for low pass filters, integrators, averagers, or other circuits that may capture values indicative of a differntial input are known and may be suitably used with the systems described herein, including, for example, filters and integrators using active circuits such as transistors and operational amplifiers.

The analog-to-digital converter 206 may be any analog-to-digital converter suitable for digitally sampling values stored on the averaging or integrating nodes. The analog-to-digital converter 206 may be, for example, a sigma-delta converter with high impedance inputs, programmable gain, and a number of inputs at least as large as the number of transducer outputs to be measured. On suitable example is a CS5524AS sigma-delta converter available from Crystal Semiconductor. It will be appreciated that no synchronization may be required between analog-to-digital converter 206 and the driver 202 in the above system 200. The analog-to-digital converter 206 may operate with a sampling window having a frequency independent of the frequency at which the driver 202 generates excitation signals for the transducers 210, 212, 214. The analog-to-digital converter 206 may, for example, have a sampling window for each integrating node of the signal conditioning block 204 of 15 Hz, while the driver 202 generates excitation pulses with a frequency of 100 Hz. It will be appreciated that the preceding frequency ranges are only examples, and that frequencies selected for a particular application will depend upon a number of factors including the accuracy desired for the analog-to-digital conversion, whether a single sample will be used or a number of samples averaged together, both on the integrating nodes of the signal conditioning block 204 and by the analog-to-digital converter 206, and expected rates of change in process measurements detected by the transducers 210, 212, 214. By selecting suitable resistors and capacitors for the integrators of the signal conditioning block 204, a large time constant may be established for the integrators, thus reducing aliasing in the sampled signal.

In general operation, the driver 202 may output a switch control signal having an on period, such as a rectangular pulse, and close a switch in the first switch array 216 to complete a circuit through one of the transducers 210, 212, 214. During the on period of the control signal, the driver 202 may then close one or more switches in the second switch array 218 corresponding to one of the tranducers 210, 212, 214. After a delay, the driver 202 may open one or more switches in the second switch array 218 that were closed above. The driver 202 may then open the switch in the first switch array 216, thus ending excitation of the transducer. The analog-to-digital converter 206 may digitally sample values stored on the integrating nodes of the signal conditioning block 204, and may forward the digital values to the processor 208 in any suitable form for further processing.

The processor 208 may be any processor capable of receiving digital values from the analog-to-digital converter 206 and processing the digital values. Processing may include, for example calculation of a process variable, such as a flow rate or a process fluid density, using measurements from the transducers 210, 212, 214. A flow rate calculation may, for example, apply known theoretical flow-rate equations, along with any assumptions, corrections for non-ideal cases, approximations, iterative solutions, and so forth that may be embodied in a digital processor. Although not required, the processor 208 may also provide control information to the driver 202 including, for example a frequency for excitation of the transducers, an order for switching the first switch array 216 and the second switch array 218, and a drive signal waveform. The processor 208 may also control operation of the analog-to-digital converter 206, including a sampling frequency, gain selection where programmable gain is available, calibration instructions and constants, and so forth. It should be appreciated that the driver 202 may also operate autonomously, and may control operation of the analog-to-digital converter 206, without intervention from the processor 208. The processor 208 may also generate output, such as control and status information for the system 200 and calculated process variables. The processor 208 may also provide instrumentation output, such as process measurements from the transducers 210, 212, 214, either as the analog-to-digital converter output, or as values converted to physical measures such as temperature, pressure, and so forth. It should also be noted that the system 200 may provide instrumentation output directly from the analog-to-digital converter 206 without intervention of the processor 208. Output from the processor 208 may be provided directly to external systems from the processor 208, or may be forwarded to additional output drive circuitry conforming to an external communication protocol. An example of a suitable processor for use with the system 200 described herein is the 68HCL11ID0CFB microcontroller available from Motorola.

Figure 3:
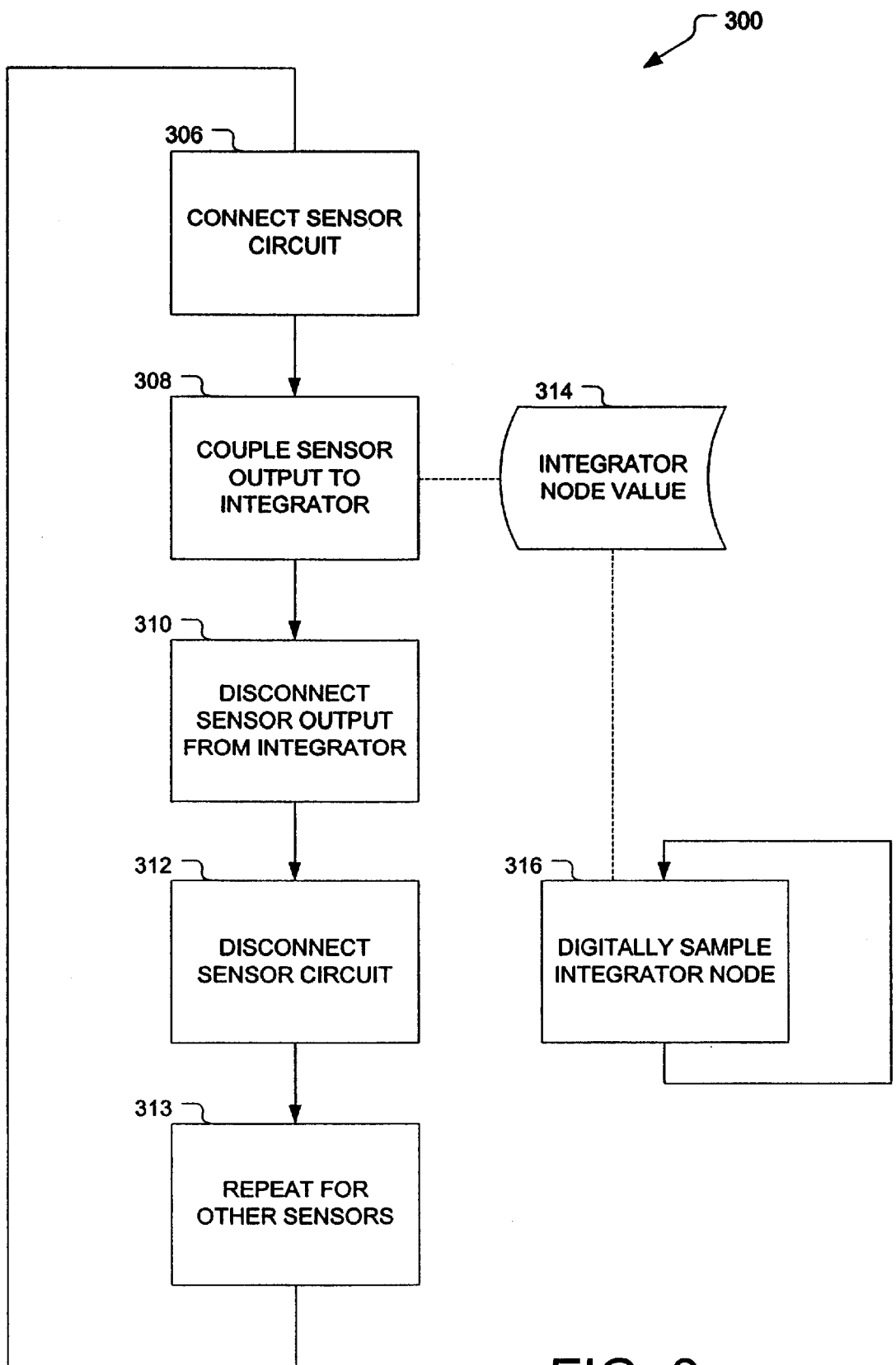
FIG. 3 is a flow chart of a process for taking process measurements.

FIG. 3 is a flow chart of a process for taking process measurements. In the following description, the terms 'sensor' and 'transducer' are used interchangeably. The process generally includes exciting a sensor during an on period, and within the on period, capturing a sensor output on an analog node, such as a node of an integrator. A process 300 begins by generating a control signal, during an on period for a sensor, to the switch array to create an electrical path through the sensor, as shown in step 306. As shown in step 308, the sensor output, which may be a differential output pair, may then be coupled to analog sampling circuitry such as an integrator. As shown in step 310, the sensor output may then be disconnected from the integrator after a suitable delay. As shown in step 312, excitation of the sensor may be terminated at the end of the on period by disconnecting the sensor circuit. The process may proceed to step 313 where the above steps are repeated for different transducers. The process 300 may then return to step 306 and the entire process may be repeated.

As represented by a data element 314 in FIG. 3, the integrator may have a node that stores a value representative of the sensor output. It should be appreciated that, while an integrator is referred to herein, other circuits may be used that can store a value representative of the sensor output. It should also be appreciated that sensors such as bridges may have two outputs which may be treated as separate, single-ended outputs, and as such, steps 308 and 310 may be repeated for a second output and a second integrator may be provided to capture a value representative of the second output.

As shown in step 316, the value, such as a voltage representative of the sensor's differential output, stored on the node of the integrator may be digitally sampled. Step 316 may be repeated at a frequency independent of the frequency of the on period, and the digital value obtained in step 316 may be filtered, averaged, or otherwise processed prior to any calculation of a process variable. As noted above, sensors or transducers having multiple outputs, such as bridge transducers, may also be treated as single-ended, and may accordingly require additional sampling of additional integrator nodes.

It will be appreciated that a number of techniques are known for implementing the processes described above, and one example is depicted in the system 200 of FIG. 2. Many of the steps and functions, except those of some of the analog components (such as the bridges), may be accomplished with software executing on a microprocessor in a computer, or on a microcontroller or programmable digital signal processor in an embedded system. The system may be integrated in its entirety into an application-specific integrated circuit, programmable gate array, programmable logic device, or other system-on-a-chip design. Any of these devices may be adapted to operate according to the teachings of the system described herein.

Figure 4:
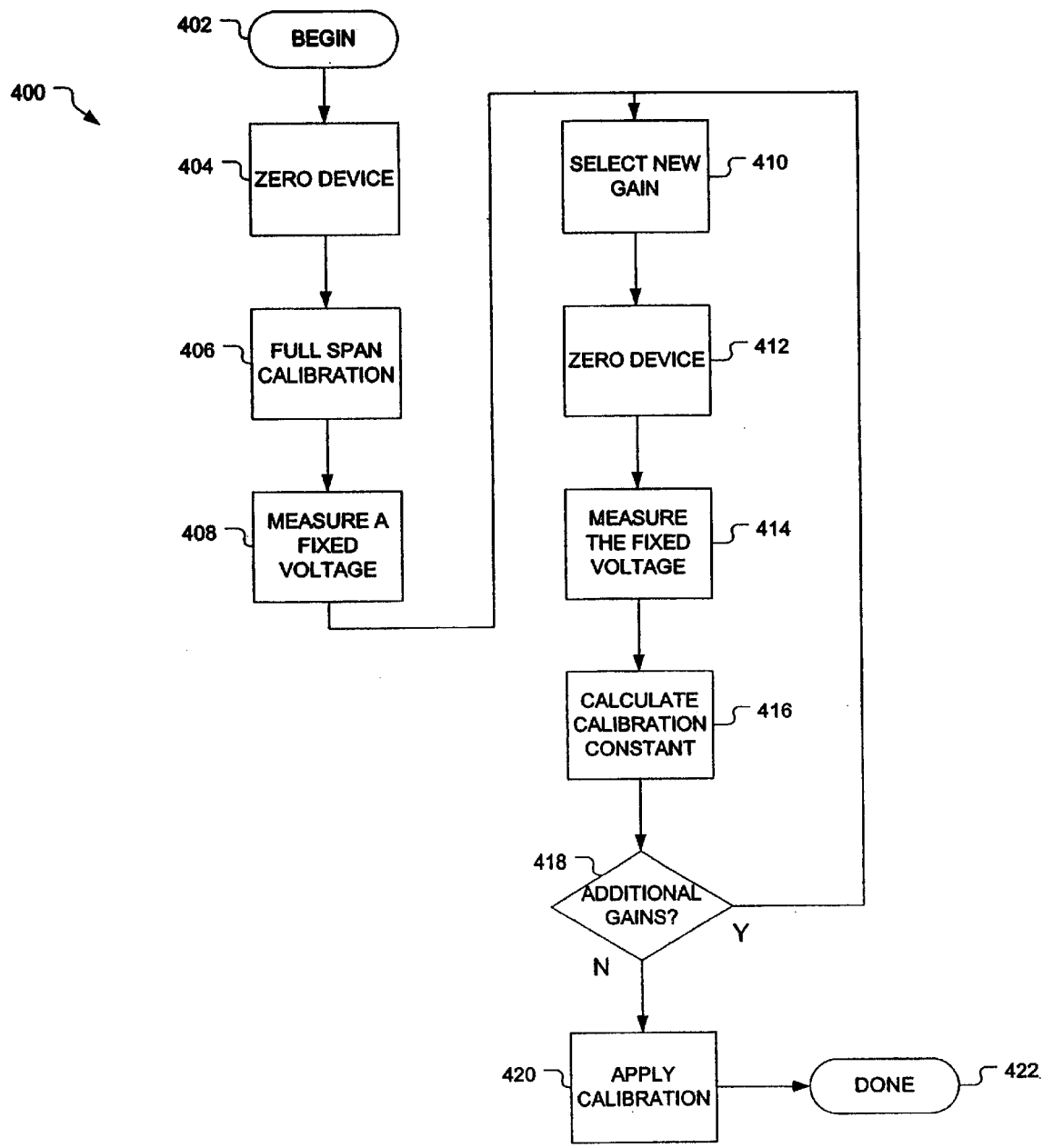
FIG. 4 is a flow chart of a process for calibrating a system for ratiometric measurements.

FIG. 4 is a flow chart of a process for calibrating a system for ratiometric measurements. Some analog-to-digital converters have programmable gain. Each gain may have associated therewith a slope and an offset. The offset represents a difference between true zero volts and a measured zero volts. The slope represents a linear relationship between a true voltage and a measured voltage. It is generally known to calibrate an analog-to-digital converter so that digital representations of measurements correspond to true values. However, where ratiometric measurements are taken from a sensor such as one of the bridge transducers 210, 212 of FIG. 2, the value of interest may be a dimensionless ratio of two same-unit physical measurements. Under these conditions, the true value of either of the two measurements need not be known, provided that the ratio of the two measurements, and changes thereto, may be accurately measured. Accordingly, there is provided herein a system for calibrating an analog-to-digital converter for ratiometric measurements. Where the response of an analog-to-digital converter is generally linear within a measurement span, the system described herein may advantageously avoid the use of complex and expensive calibration hardware based upon precision voltage references. Although the following discussion relates to analog-to-digital converters with programmable gain and calibration, it should be appreciated that the methods described below may be applied to other systems for ratiometric measurement, such as an analog-to-digital conversion system where gain and calibration are provided by external circuitry.

A process 400 begins 402 by zeroing the analog-to-digital conversion device, as shown in step 404. The result may be an offset equal to the difference between a measurement of an applied zero volt source (such as a ground) and a value at the center of the device's full span. A full span calibration 406 may then be performed using, for example, an external precision voltage reference or an internal voltage reference. It will be appreciated that some devices may have an auto-calibrate function which performs these functions automatically, such as the analog-to-digital converter noted above. The results of steps 404 and 406 may be stored on the device and used by the device independently to calibrate measurements, or the results may be transmitted to a processor which applies the results to subsequent measurements. Accurate ratiometric measurements may be taken without calibration to a true voltage such as a precision voltage reference. However, such calibration may nonetheless be useful to ensure, for example, that subsequent test voltages remain within the physical limits of the gains that are selected for the following ratiometric calibration.

As shown in step 408, the device may then be used to measure a fixed voltage, thus providing a first digital value. It should be appreciated that the fixed voltage need not be known, provided that the fixed voltage remains stable during successive measurements, using criteria such as parts per million of variations, the quantization level of the device, or an absolute range, e.g., 0.1 mV. Suitable sources for the fixed voltage may be a precision voltage reference or a voltage derived from a stable voltage or current source using, for example, a resistor ladder.

A new gain may then be selected for the device, as shown in step 410. The device may then be zeroed, as shown in step 412. The fixed voltage may again be measured, as shown in step 414, to obtain a second digital value. As shown in step 416, a ratiometric calibration constant may then be calculated. The ratiometric calibration constant may have the general form of a ratio of the first digital value to the second digital value, or more specifically, a value determined by the slope and offset determined from the first measurement in step 408 and the slope and offset determined from the second measurement in step 414. Where the device internally stores and applies offsets for each gain, the offset from the zeroing steps may be omitted from subsequent calculations. As used herein, the term 'calibration constant' may refer to a formula, such as the mathematical representation of the first slope and offset to the second slope and offset, or to a number, such as the ratio of two measurements of the voltage at different gains. This ratiometric calibration constant may then be applied to obtain a calibrated value from the ratio of a measurement at the first gain and a measurement at the second gain. Such a pair of measurements may be typical of, for example, the dimensionless ratio of two measurements taken from a bridge transducer such as the bridge transducers 210, 212 of FIG. 2.

As shown in step 418, it may then be determined whether to ratiometrically calibrate additional gains of the device. If there are additional gains, the process 400 may return to step 410 and a new gain may be selected. Where a number of gains are ratiometrically calibrated, an accurate ratio of measurements may be provided through successive application of one or more of the ratiometric calibration constants. That is, if a first ratiometric calibration constant is calculated to relate a first gain to a second gain, and a second ratiometric calibration constant is calculated to relate the second gain to a third gain, then a measurement taken at the first gain may be accurately ratioed with a measurement at the third gain by applying the first ratiometric calibration constant and the second ratiometric calibration constant.

If there are no additional gains, the process 400 may proceed to step 420 where the ratiometric calibrations may be applied to process measurements. A number of variations may be possible to the above process 400, and are intended to fall within the scope of systems described herein. As one example, the full span calibration to a known voltage in step 406 may be omitted. In this example, the fixed voltage may be selected to be a value known to fall within the span for all gains for which ratiometric calibration is to be performed. As another example, measurements taken of the fixed voltage, such as in steps 408 and 414, may be repeated a number of times and averaged to improve the accuracy of the ratiometric calibration constants. The process 400 may then end, as shown in step 422.

It will be appreciated that a number of techniques are known for implementing the processes described above. Many of the steps and functions, except for the analog components (such as the integrator and the bridges) and analog/digital conversion, may be accomplished with software executing on a microprocessor in a computer, or on a microcontroller or programmable digital signal processor in an embedded system. The system may be integrated in its entirety into an application-specific integrated circuit, programmable gate array, programmable logic device, or other system-on-a-chip design. Any of these devices may be adapted to operate according to the teachings of the system described herein.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for process measurement comprising:
providing a plurality of control signals, the control signals having:
one or more on periods that do not coincide with the on periods of the other control signals, and,
a first frequency at which the one or more on periods are repeated;
driving a plurality of process measurement transducers with a power source in response to the control signals by selectively coupling the process measurement transducers to ground with the control signals, the process measurement transducers having an output;
capturing the output of the process measurement transducers within the one or more on periods of the control signals to provide a captured output;
sampling the captured output at a second frequency that is independent of the first frequency to provide a sampled value; and
providing a digital representation of the sampled value.

2. The method of claim 1 wherein capturing the output includes capturing the output on a node of a gated integrator.

3. The method of claim 2 wherein the gated integrator includes a low pass filter.

4. The method of claim 1 wherein sampling the captured output further comprises sampling the captured output with an analog-to-digital converter.

5. The method of claim 4 wherein the analog-to-digital converter is a sigma-delta analog-to-digital converter.

6. The method of claim 1 wherein the first frequency is greater than the second frequency.

7. The method of claim 6 wherein the first frequency is at least twice as high as the second frequency.

8. The method of claim 1 wherein the process measurement transducer includes a bridge having a differential output.

9. The method of claim 1 wherein the process measurement transducer includes at least one of an absolute pressure sensor, a differential pressure sensor, and a temperature sensor.

10. The method of claim 1 wherein the control signals control operation of a plurality of switches, the switches coupling the power source to ground through the process measurement transducers.

11. The method of claim 1 further comprising applying the digital representation of the sampled value to calculate a process variable.

12. The method of claim 11 wherein the process variable is a volume flow rate.

13. A system for process measurement comprising:
source means for providing a plurality of control signals having:
one or more on periods that do not coincide with the on periods of the other control signals, and,
a first frequency at which the one or more on periods are repeated,
where the source means drives a plurality of process measurement transducers with the control signals by selectively coupling the transducers to ground, the process measurement transducers having an output;
capturing means for capturing the output of the process measurement transducers on a node of at least one gated integrator within the one or more on periods of the control signals;
sampling means for sampling the node of the at least one gated integrator at a second frequency that is independent of the first frequency to provide a sampled value; and
an output means for providing a digital representation of the sampled value.

14. A multivariable transmitter for measuring a process variable comprising:
a power source;
a driver, the driver providing a plurality of control signals having:
one or more on periods that do not coincide with the on periods of the other control signals, and,
a first frequency at which the one or more on periods are repeated;
a plurality of process measurement transducers selectively coupled between the power source and a ground in response to the control signals, the process measurement transducers having an output indicative of a process measurement:

at least one integrator selectively coupled to the output of the process measurement transducers within the one or more on periods of the control signals, the at least one integrator capturing the output of the process measurement transducers on a node of the at least one integrator within the one or more on periods of the control signals;

a digital sampler, the digital sampler acquiring a sampled value of the node of the at least one integrator at a second frequency that is independent of the first frequency, and the digital sampler providing a digital representation of the sampled value; and a processor that receives the sampled value and calculates a process variable using the sampled value.

15. The multivariable transmitter of claim 14, wherein the process measurement includes at least one of an absolute pressure, a differential pressure, and a temperature of a process fluid.

16. The multivariable transmitter of claim 14 wherein the process variable is a flow rate of a process fluid.

17. The multivariable transmitter of claim 14, wherein the processor transmits at least one of the process variable or the process measurement to an external system.

18. A system for measuring a process variable comprising:

a driver, the driver providing a plurality of control signals having:
one or more on periods that do not coincide with the on periods of the other control signals, and,
a first frequency at which the one or more on periods are repeated;

a plurality of process measurement transducers driven with an excitation in response to the control signals by selectively coupling the process measurement transducers to ground, the process measurement transducer having an output indicative of a process variable;

at least one gated integrator selectively coupled to the output of the process measurement transducers within the one or more on periods of the control signals, the at least one gated integrator capturing the output of the process measurement transducers on a node of the at least one gated integrator within the one or more on periods of the control signals;

a digital sampler, the digital sampler acquiring a sampled value of the node of the at least one gated integrator at a second frequency that is independent of the first frequency, and the digital sampler providing a digital representation of the sampled value; and a processor that receives the sampled value and calculates a process variable using the sampled value.

19. The system of claim 18 wherein the driver includes a microcontroller.

20. The system of claim 18 wherein the process measurement transducer includes a bridge transducer having a differential output pair.

21. The system of claim 18 wherein the digital sampler includes a sigma-delta analog-to-digital converter.

22. A method comprising:

providing a plurality of control signals, the control signals having:
one or more on periods that do not coincide with the on periods of the other control signals, and,
a first frequency at which the one or more on periods are repeated;

driving a plurality of process measurement transducers in response to the control signals by selectively coupling the process measurement transducers to ground; and, capturing the output of tile process measurement transducers within the one or more on periods of the control signals.

23. A method according to claim 22, further comprising sampling the captured output at a second frequency that is independent of the first frequency.

24. A method according to claim 22, wherein capturing the output includes capturing the output on a node of at least one gated integrator.

25. A method according to claim 24, wherein the at least one gated integrator includes a low pass filter.

26. A method according to claim 22, wherein the first frequency is at least one of:
greater than the second frequency and at least twice as high as the second frequency.

27. A method according to claim 22, wherein the process measurement transducers include at least one of: at least one bridge having a differential output, at least one absolute pressure sensor, at least one differential pressure sensor, and at least one temperature sensor.

28. A method according to claim 22, wherein the control signals control a plurality of switches to couple a power source to ground through the process measurement transducers.

29. A multivariable transmitter comprising:

a driver for providing a plurality of control signals, the control signals having:
one or more on periods that do not coincide with the on periods of the other control signals, and,
a first frequency at which the one or more on periods are repeated; and, a plurality of process measurement transducers selectively coupled between a power source and a ground in response to the control signals.

30. A multivariable transmitter according to claim 29, further comprising:

at least one integrator selectively coupled to the output of the process measurement transducers within the one or more on periods of the control signals, the at least one integrator capturing the output of the process measurement transducers within the one or more on periods of the control signals;

31. A multivariable transmitter according to claim 29, wherein the process measurement transducers include at least one of: at least one bridge having a differential output, at least one absolute pressure sensor, at least one differential pressure sensor, and at least one temperature sensor.

* * * * *

UNITED STATES PATENT AND TRADEMARK OFFICE
CERTIFICATE OF CORRECTION

PATENT NO. : 6,529,847 B2
DATED : March 4, 2003
INVENTOR(S) : Gordon L. Hamilton et al.

It is certified that error appears in the above-identified patent and that said Letters Patent is hereby corrected as shown below:

<u>Column 12,</u>
Line 11, replace "tile" with -- the --

Signed and Sealed this

Thirteenth Day of May, 2003

JAMES E. ROGAN
*Director of the United States Patent and Trademark Office*